No. 620,705. Patented Mar. 7, 1899.
E. H. HAUPT.
BICYCLE TIRE ARMOR.
(Application filed Sept. 30, 1898.)
(No Model.)
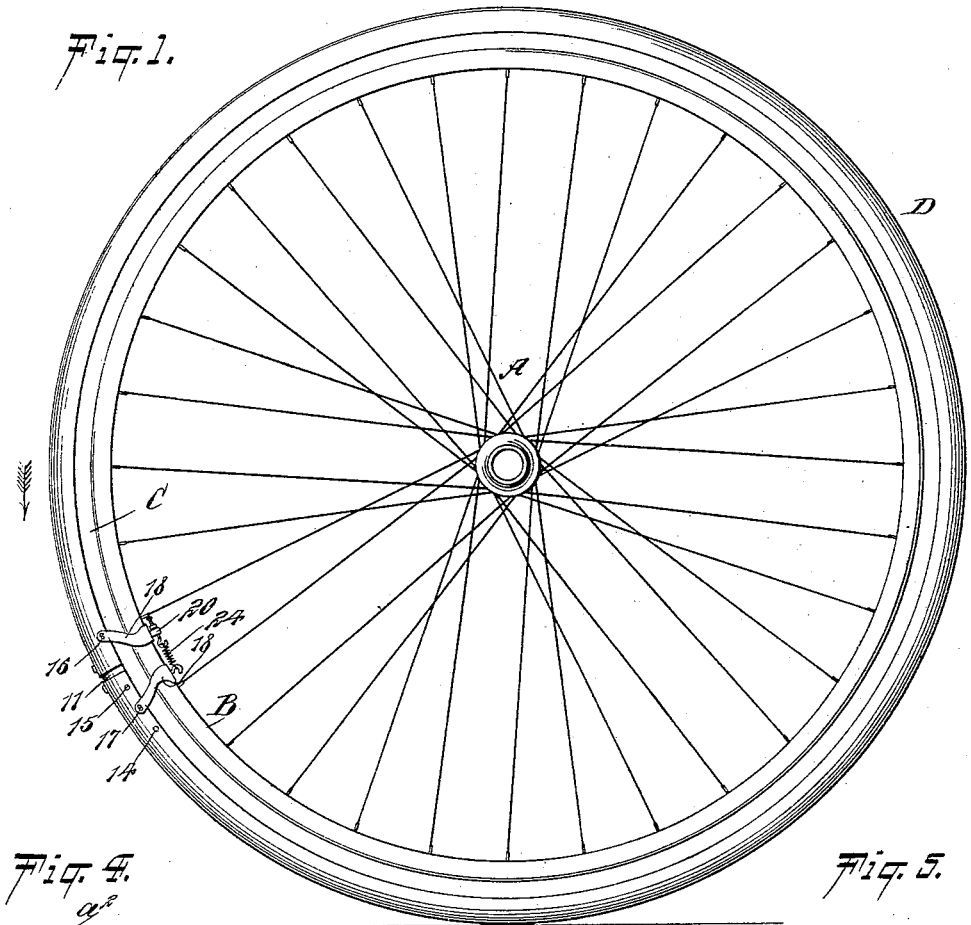
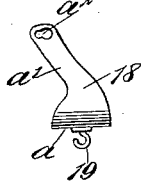
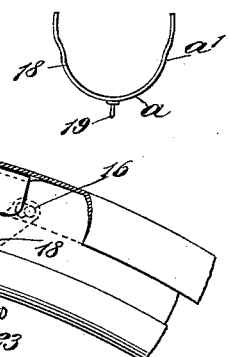
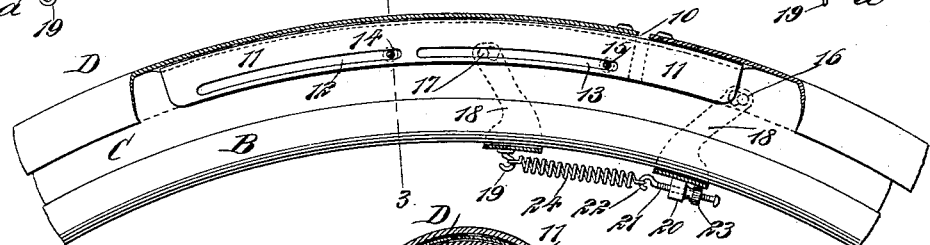
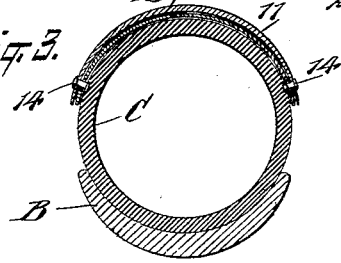
WITNESSES:
William P. Goebel.
INVENTOR
Emil H. Haupt.
BY
ATTORNEYS.
THE NORRIS PETERS CO., PHOTO-LITHO., WASHINGTON, D. C.

UNITED STATES PATENT OFFICE.

EMIL H. HAUPT, OF NEW YORK, N. Y.

BICYCLE-TIRE ARMOR.

SPECIFICATION forming part of Letters Patent No. 620,705, dated March 7, 1899.

Application filed September 30, 1898. Serial No. 692,321. (No model.)

*To all whom it may concern:*

Be it known that I, EMIL H. HAUPT, of the city of New York, borough of Manhattan, in the county and State of New York, have invented a new and useful Improvement in Bicycle-Tire Armor, of which the following is a full, clear, and exact description.

The object of the invention is to provide any bicycle-tire with an armor or semicasing of steel or other hard elastic non-puncturable material, and, furthermore, to so construct the armor that it will yield lengthwise to such an extent as not to interfere to any appreciable degree with the elasticity of pneumatic or cushioned tires provided for a wheel and over which the armor is placed.

A further object of the invention is to provide a means for quickly and conveniently attaching the armor or to detaching said armor from the wheel and to provide a fastening device that will not interfere with the automatic adjusting movement of the armor.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a wheel having the improvement applied. Fig. 2 is an enlarged side elevation of a portion of the rim and tire of the wheel, illustrating also a portion of the armor, which latter is partly in section. Fig. 3 is a transverse section on the line 3 3 of Fig. 2. Fig. 4 is a side elevation of one of the clamps, and Fig. 5 is an edge view of the clamp shown in Fig. 4.

A represents a bicycle-wheel, B the rim, and C the tire, which may be a pneumatic or cushioned tire, as in practice may be found most desirable, and D represents the armor provided for the tire.

The armor D is preferably made of thin steel; but it may be constructed of any other non-puncturable material, and the said armor is made to conform in a measure to the exterior contour of the tire C, extending over the tread portion of the tire, along the sides thereof, as shown in Figs. 1 and 3, and also preferably the said armor is thickest at its center, being gradually tapered in direction of its side edges, as is especially shown in Fig. 3.

The armor D is not endless, but is separated transversely, so as to provide two abutting end sections, as illustrated in Fig. 1, the division being indicated by the reference-numeral 10 in Fig. 2. A section 11, however, is brazed, cemented, or otherwise attached at or near one of the ends of the armor, at the inner face thereof, as shown in Fig. 2, and the said added section 11 is made to extend inside of the armor, a suitable distance beyond the opposing end of said armor, as is also shown in Fig. 2. The added section 11 of the armor admits of guided expansion and contraction of the said armor at its ends, and the added section 11 is provided at each side with two longitudinal slots 12 and 13, as shown in Fig. 2, and studs or buttons 14 and 15 are carried through the armor and through the slots 12 and 13 of the added section thereof.

At each side of one end of the armor (that underneath which the added section 11 passes) a button 16 or an equivalent projection is located, and similar buttons or projections 17 are secured to the armor at each side near its opposite end, as shown in Fig. 1.

In connection with the armor D clamps 18 are employed. Each of these clamps comprises a stirrup-body $a$ and arms $a'$, that are at an angle to the stirrup-body, the arms of the two clamps being inclined in opposite directions, as shown in Fig. 1, and the arm $a'$ of each clamp is provided at or near its outer end with a horizontally-located keyhole-slot $a^2$ or a slot of similar contour. The stirrup-body portions $a$ of the clamps are adapted to fit to the exterior surface of the rim B, and the arms $a'$, as shown in Fig. 5, are so formed that they will conform to the outer side surfaces of the exposed portions of the tire and the outer side surfaces of the armor D. One of the clamps 18 is provided with a hook 19, secured to the lower portion of its body, and the other clamp is provided with a threaded eye 20, which receives a screw 21, the said screw being provided with a hook 22 at the end facing the opposing clamp, and at its free end the screw 21 is made to carry a nut 23, so that the screw may be made to travel, through the medium of the said nut, outward or inward in its supporting-eye.

When the clamps are placed in position upon the wheel, the studs 16 and 17 are respectively made to pass into the slots $a^2$ at the outer ends of the clamps, and the hook 19 of one clamp is connected with the hook 22 on the screw 21 through the medium of a spring 24. It is evident that this tension device—namely, the spring and the screw—will serve to draw the ends of the armor together to a greater or to a less extent and that one end portion of the armor is free to slide more or less upon the extension member 11, attached to the opposite end of the armor, so that when the wheel passes over the ground the armor can give more or less and will not crowd or unduly clamp the tire over which it may be placed, the extent to which the armor may give being regulated by the adjustment of the said screw 21. It is furthermore evident that when a tire is protected as above set forth—namely, by the armor D—said tire is rendered non-puncturable, and the elasticity of the tire, whether it be a pneumatic or a cushioned one, is not in any appreciable manner interfered with. It is also evident that by adjusting the screw 21 so that the spring 24 may be disconnected from the parts to which it is attached the clamps may be expeditiously and conveniently removed, also the armor, and that the armor may be placed in position on the wheel and held in such position in as ready and expeditious a manner.

The wheel is to be so placed upon its axle that the end of the armor which has sliding movement on the extension 11 will face in a direction opposite to the travel of the wheel.

Having thus described my invention, I claim as new and desire to secure by Letters Patent—

1. An armor for the tire of a wheel extending across the tread and at the sides of the tire, the said armor being provided with opposing ends, clamps adapted to support the end portions of the armor and a spring tension device connected with the said clamps and serving to draw the ends of the armor toward each other, for the purpose specified.

2. In a vehicle-wheel, an armor for the tire, said armor extending across the tread and along the sides of the tire, the armor being constructed in one length, and provided with opposing ends, one of which ends is provided with an attached extension held to slide within the armor in engagement with the inner face of the opposite end, the extension having slots produced therein, clamps adapted to receive the rim and tire of the wheel, said clamps being detachably connected to the end portions of the armor, a tension device connected with the said clamps, and means, substantially as described, for limiting the movement of the extension-section of the armor, as and for the purpose specified.

3. In a vehicle-wheel, the combination, with the wheel, its rim and a yielding tire, of an armor for the said tire and partially embracing the same, the armor having opposing ends, an extension attached to one end of the said armor, having sliding movement within the armor at the opposite end, the extension being provided with slots and the armor with guide-pins extending within the said slots, clamps fitted to the rim and tire, the said clamps being detachably connected with the armor at its end portions, and a tension device connecting the said clamps, for the purpose specified.

4. In a vehicle-wheel, an armor for the tire thereof, constructed of a single piece of material made to conform to the tire and provided with opposing ends, studs or buttons projecting from the sides of the armor near its ends, clamps fitted to the rim and tire and each comprising a stirrup-body and arms arranged at an angle to the body, each of said arms being provided with a slot at or near its outer end adapted to receive the projecting studs on the sides of the armor, and a tension device for connecting the body portions of the said clamps, substantially as shown and described.

EMIL H. HAUPT.

Witnesses:
MARK P. STOKES,
WM. S. SCHUMANN.